US006766612B1

(12) United States Patent
Liu

(10) Patent No.: US 6,766,612 B1
(45) Date of Patent: Jul. 27, 2004

(54) APPARATUS AND METHOD TO TREAT MATERIALS FOR PEST CONTROL AND STORAGE

(75) Inventor: Yong-Biao Liu, Salinas, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/427,500

(22) Filed: May 1, 2003

(51) Int. Cl.⁷ ............................................. A01M 13/00
(52) U.S. Cl. ..................................................... 43/125
(58) Field of Search ........................ 43/125, 124, 132.1

(56) References Cited

U.S. PATENT DOCUMENTS

| | | | | | |
|---|---|---|---|---|---|
| 1,401,292 | A | * | 12/1921 | Meter | 424/40 |
| 1,513,138 | A | * | 10/1924 | Sigmund | 43/124 |
| 1,817,534 | A | * | 8/1931 | Spanel | 422/294 |
| 4,800,672 | A | * | 1/1989 | Jackson | 43/125 |
| 4,976,062 | A | * | 12/1990 | Rutledge et al. | 43/131 |
| 5,148,627 | A | * | 9/1992 | Thomas | 43/125 |
| 5,312,034 | A | | 5/1994 | Nakagawa et al. | |
| 5,318,789 | A | | 6/1994 | Nakagawa et al. | |
| 5,359,805 | A | * | 11/1994 | Kadokura | 43/124 |
| 5,365,692 | A | | 11/1994 | Gustafson | |
| 5,584,139 | A | * | 12/1996 | Wentworth | 43/124 |
| 6,074,608 | A | | 6/2000 | Matz | |
| 6,450,188 | B1 | | 9/2002 | Langhart | |

FOREIGN PATENT DOCUMENTS

| | | | | |
|---|---|---|---|---|
| EP | 579556 | A1 * | 1/1994 | A01M/17/00 |
| GB | 2275594 | A * | 9/1994 | A01M/19/00 |

OTHER PUBLICATIONS

Chiu, K.Y., Chen, C.L. and Sung, J.M., "Partial vacuum storage improves the longevity of primed sh–2 sweet corn seeds," *Scientia Horticulturae* (2003) 98:99–111.

Romanazzi, G., Nigro, F., Ippolito, A., and Salerno, M., "Effect of short hypobaric treatments on postharvest rots of sweet cherries, strawberries and table grapes," *Postharvest Biology and Technology* (2001) 22:1–6.

Wang, Z., and Dilley, D.R., "Hypobaric storage removes scald–related volatiles during the low temperature induction of superficial scald of apples," *Postharvest Biology and Technology* (2000) 18:191–199.

* cited by examiner

*Primary Examiner*—Peter M. Poon
*Assistant Examiner*—Bethany L. Griles
(74) *Attorney, Agent, or Firm*—David R. Nicholson; John D. Fado

(57) ABSTRACT

The invention is directed to an apparatus and method of treating agricultural commodities for pests. It is a portable, dismantleable box that can be erected around a stack or array of loaded shipping containers. An impermeably envelope is wrapped around the box and is used to create a controlled atmosphere for treatment of the contents of the shipping containers. This is achieved by creating hypobaric conditions inside the impermeable envelope, by introducing pesticide to the impermeable envelope, or by some combination of both vacuum and pesticide. Finally, the apparatus may be used for postharvest storage of materials that are susceptible to spoilage or pest damage.

19 Claims, 5 Drawing Sheets

APPARATUS AND METHOD TO TREAT MATERIALS FOR PEST CONTROL AND STORAGE

CROSS-REFERENCE TO RELATED APPLICATIONS

This application is unrelated to any other pending applications.

BACKGROUND OF THE INVENTION

Field of the Invention

The present invention relates to the control of agricultural pests, especially during postharvest packaging, shipment, and storage.

The prior art in this field generally involves the use of large, fixed fumigation facilities that require consolidation of agricultural commodities for treatment, a process that is not only expensive but also a major bottleneck in the flow of agricultural products from field to market.

Prior art treatment for pest control also includes use of vacuum conditions to accelerate insect death during fumigation. However, prior art vacuum fumigation requires use of expensive vacuum chambers.

Hypobaric storage of agricultural commodities also is advantageous since it can retard spoilage of many perishable commodities, but it is also cost-prohibitive.

Therefore, the problem to be solved is how to create hypobaric conditions for boxed products that can make vacuum fumigation and hypobaric storage of agricultural commodities practical and economical.

SUMMARY OF THE INVENTION

The present invention is directed to a practical and economical apparatus and method to create vacuum (hypobaric) conditions for pest control and/or storage of agricultural commodities contained in cartons or boxes.

The process begins by forming a stack of cartons containing agricultural commodities such as fruit or vegetables. This stack can be placed on a pallet for ease of handling.

The stack is then covered with rigid or semi-rigid panels or sheets of wood, plastic or metal that are strong enough to resist bending when vacuum is applied.

The sheets are pressed directly against the outer surface of the cartons, forming a box or shell around the stack of cartons.

Next, the shell is covered with an impermeable envelope, made from plastic or other material, that can be sealed from the atmosphere.

The envelope has one or more inlets for fumigants or gases to enter or to be evacuated.

Vacuum conditions are created and maintained inside the envelope, which will result in negative pressure on the panels and inward pressure on all carton surfaces.

The inward pressure on the carton surfaces is distributed to the supporting matrix of the carton walls, thereby maintaining the integrity of both the carton stack as well as the individual cartons under vacuum conditions.

Pesticide gases may also be introduced inside the sealed envelope, either with or without vacuum conditions.

Finally, it is known that storing agricultural commodities under hypobaric conditions operates to extend shelf life.

An object and advantage of the invention is that it provides a practical and economical means to treat agricultural commodities for pests.

A major advantage of this invention is that it provides an alternative to expensive specialized facilities currently being used for pest control.

A further object of the invention is that it is portable and inexpensive, making it unnecessary to invest in or otherwise maintain large pest treatment facilities currently in use, and also making it ideal for small producers and those in developing countries.

A further object of the invention is that it permits effective, non-destructive application of vacuum conditions to crush-prone boxed commodities.

Yet another object and advantage is that the invention permits treatment for pests with or without vacuum conditions.

A still further object and advantage is that the invention provides for controlled atmosphere storage and/or shipment of commodities under hypobaric conditions.

Another advantage is that the invention reduces processing time of agricultural commodities, thus allowing such products to arrive at market more rapidly when compared to those commodities that are processed at large, fixed pest treatment facilities.

Finally, a major object and advantage of the invention is that it can be used with a wide range of fruits, vegetables and other commodities susceptible to pest damage which can then be shipped in hypobaric and/or low oxygen environments, thus retarding spoilage and preserving their freshness.

Other objects and advantages will become apparent from reading the detailed disclosure and specification below.

BRIEF DESCRIPTION OF THE DRAWINGS

FIG. 3 also represents a symmetrical box-like structure or shell having three axes.

FIG. 3(a) shows a plurality of interconnecting panels or subpanels being used to cover a single side of the stack.

The following is a list of parts and features, along with their nomenclature:

a. box or carton containing agricultural commodities, 20
b. Substantially symmetrical stack or array of boxes or cartons, 21
c. Flat panel or sheet, 22
d. Flange-like lip on edge of flat panel, 23
e. Vent, 24
f. Shell formed from dismantelable array of panels, 25
g. Inlet port, 26
h. Outlet port, 27 i. Impermeable envelope, 28 j. Envelope closure, 29 k. Sectional panels or subpanels, 33, 35, 37

DEFINITIONS

To facilitate understanding of the invention, a number of terms are defined below.

"Hypobaric conditions" refers to negative pressure compared to ambient atmospheric pressure and is used interchangeably with "vacuum."

"Fumigants" refer to gaseous pesticides, such as but not limited to methyl bromide and hydrogen cyanide, normally used to kill or incapacitate agricultural pests.

"Controlled atmosphere" refers to an atmosphere of controlled concentrations of composing gases, usually intended for storage of perishable products or pest control. In a broader sense, "controlled atmosphere" refers to any atmosphere different from ambient.

"Insecticidal atmosphere" means a controlled atmosphere intended to kill or incapacitate insects.

"Agricultural commodities" refers to crops, grains, vegetables, fruit, nuts, berries, foodstuffs, ornamental plants, flowers, items of commerce derived from any of the foregoing, and any other commodity that is economically important to agriculture or related industries such as, but not exclusively, the timber industry or the natural fiber industry.

"Synergist" refers to a chemical added to a pesticide to increase the level of activity of the pesticide.

"Symmetrical" in this application refers to a geometric shape with three axes. Examples include, but are not limited to, a cube or a rectangular, three dimensional box.

DETAILED DESCRIPTION OF THE INVENTION

The present invention is directed to both an apparatus and a method to create vacuum (hypobaric) conditions in cartons containing agricultural foodstuffs or other perishable commodities and ornamental plants such as, but not limited to, flowers.

This hypobaric condition is created for multiple purposes. First, subjecting agricultural commodities to vacuum conditions, by itself serves as a means to eliminate, kill, or otherwise control pests. Second, vacuum in combination with various pesticides increases the effectiveness of those pesticides. And third, storing and transporting agricultural commodities in vacuum conditions retards spoilage and serves as a means to preserve perishable commodities.

Figure 1:
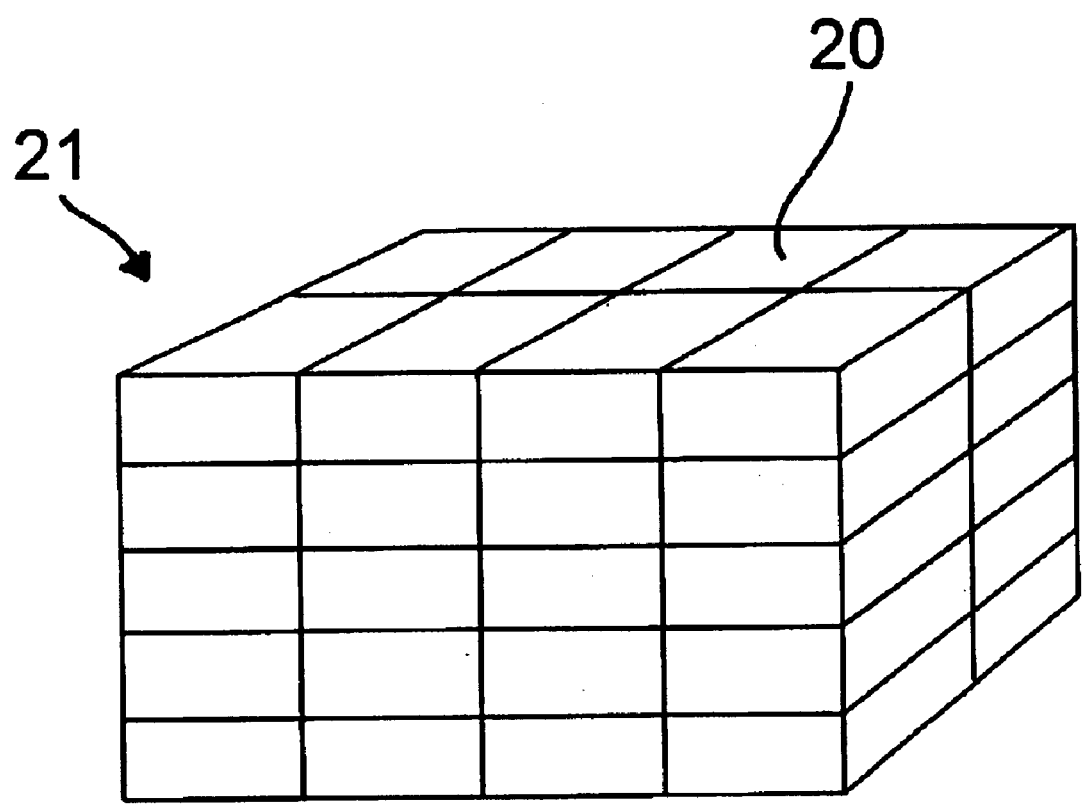
FIG. 1 shows a perspective view of a stack of boxes containing agricultural commodities.

The apparatus is assembled and the process begins by arranging individual boxes or cartons containing agricultural commodities (20) into the form of a substantially symmetrical stack or array (21). See FIG. 1. This stack or array will ordinarily but not always have six well-defined sides or surfaces (four sides, top, and bottom), each of which being substantially flat and even. See FIG. 1. It is not necessary for the stack to be completely symmetrical, but it is important for the stack to have substantially flat and even sides for reasons that will become apparent below. The size of the array will depend, ordinarily, on the amount of product to be treated as well as the handling equipment available. For example, if forklifts and pallets are available, then the stack may be made to match the size of the pallet and can even be placed or built right on top of the pallet itself. However, one of the advantages of this invention is its versatility and the fact that it can be used with relatively small amounts of produce, such as an amount less than pallet-size, for example.

Figure 2:
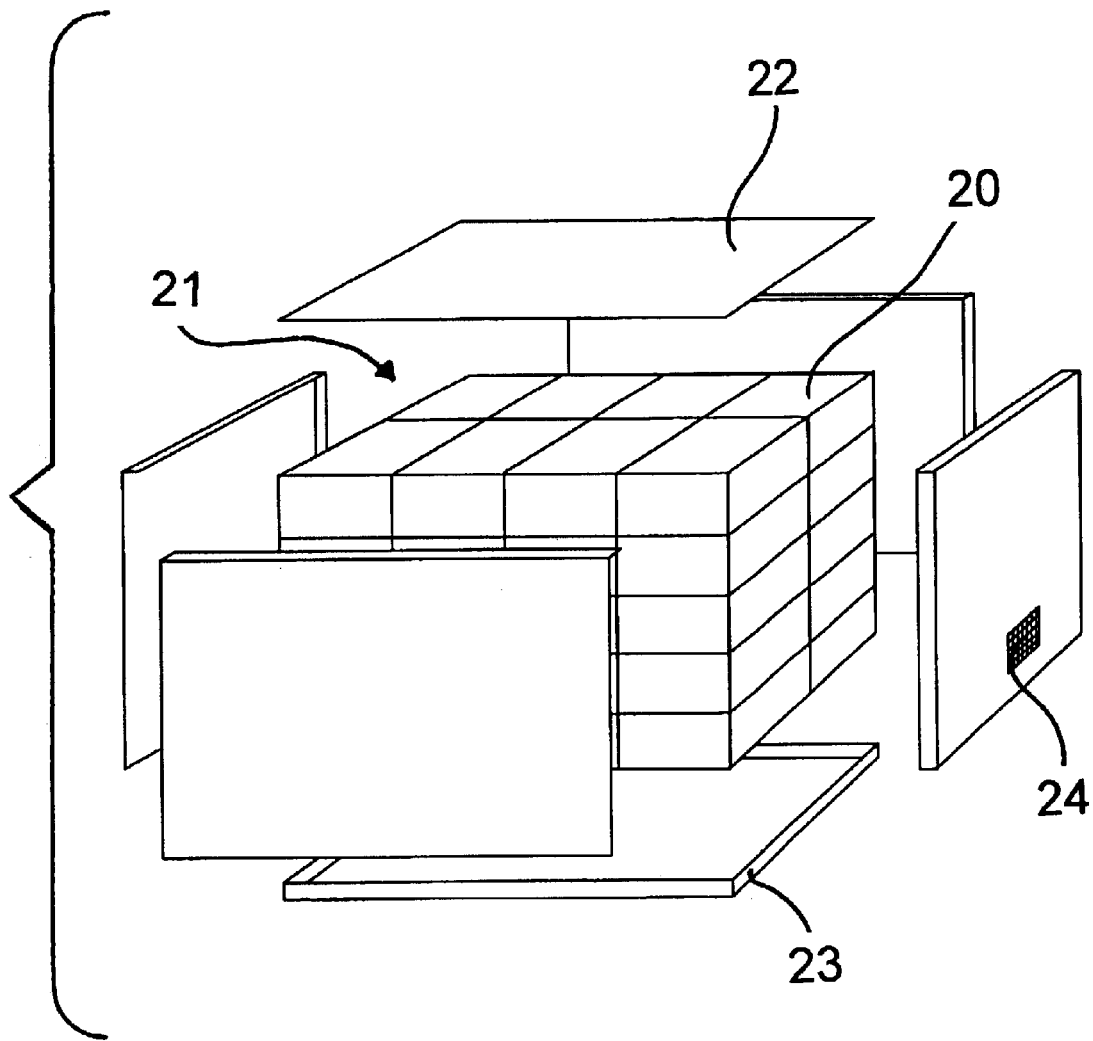
FIG. 2 shows an exploded view of the array of sheeting or paneling, made from rigid or semi-rigid materials such as plastic, wood, or metal, that is used to form a box-like structure or shell around a stack of boxes containing agricultural commodities.
Figure 3:
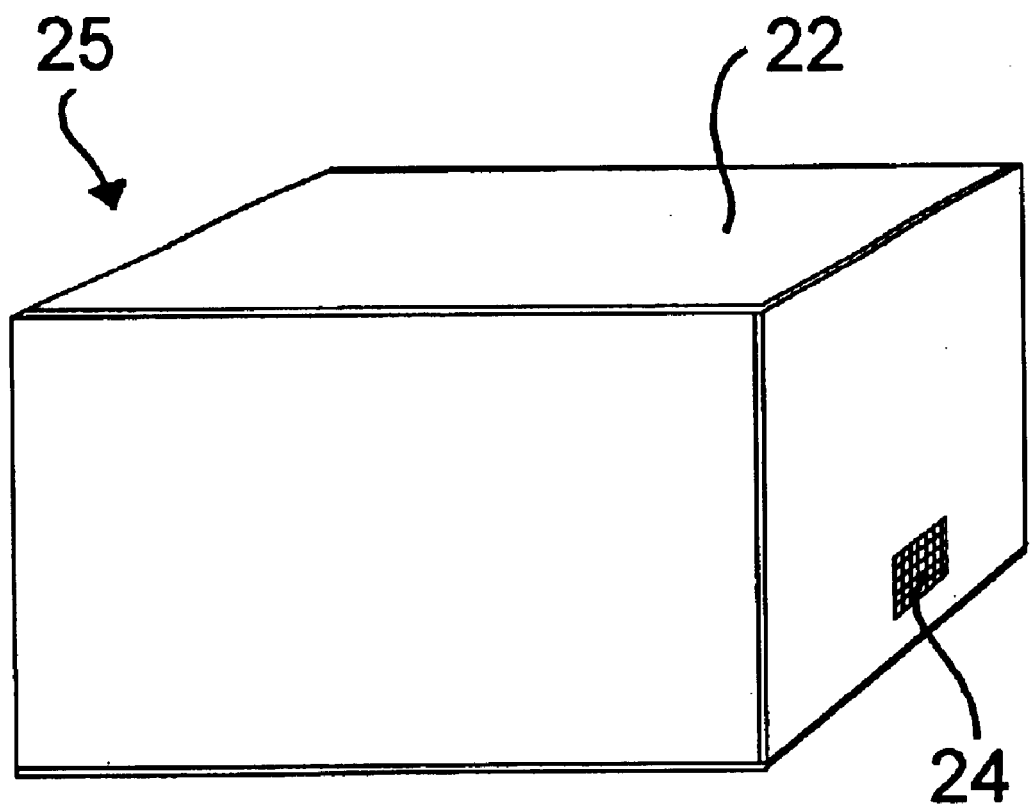
FIG. 3 shows a perspective view of the shell, assembled from sheets of rigid or semi-rigid material, surrounding a stack of boxes containing agricultural commodities. Each side of the shell is covered by a single sheet.
Figure 3A:
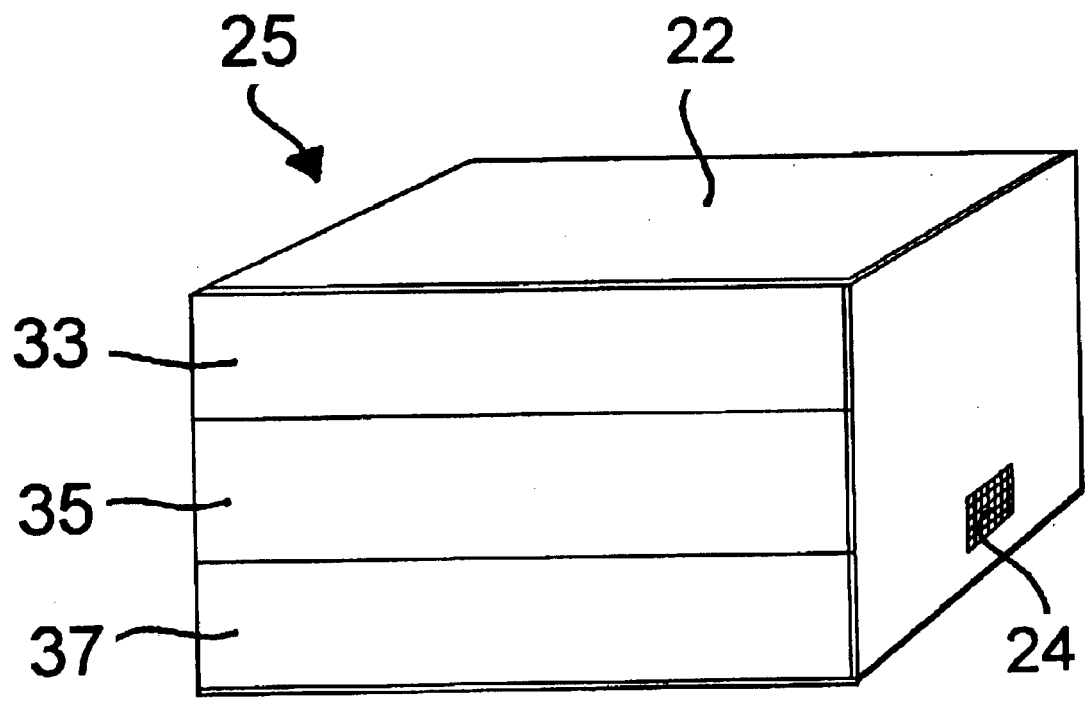
FIG. 3(a) shows a perspective view of a variation of the shell, assembled from sheets of rigid or semi-rigid material.

Next, each side of the substantially symmetrical stack of cartons is covered with a sheet or panel (22) of rigid or semi-rigid material such as, but not limited to, metal, wood, plywood, pressboard, or non-deformable plastic. See FIG. 2. Once in place, these interconnecting sheets or panels will form a dismantleable box or shell (25) around said cartons. See FIG. 3. One or more panels may have a ventilation window (24), which will assist in the free flow of gas into and out of the shell. Ordinarily, each panel will be a single piece of a similar size and shape as the surface it is covering. On occasion, however, it may be desirable or necessary to construct a sectional panel (31), comprised of a plurality of individual pieces or subpanels (33, 35, 37). See FIG. 3(*a*). FIG. 3(*a*) illustrates a panel comprised of three individual pieces, but it is not necessary for a sectional panel to have any particular number of individual pieces. The number and shape of the pieces used to construct a sectional panel will depend upon the materials available as well as the size and shape of the surface to be covered.

Because the cartons have been stacked and arranged to form a substantially flat and even surface, the panels will lay against, abut, or otherwise make contiguous or near-contiguous contact with the outer surface of the cartons. This will ensure that there is little or no gap between the cartons and the shell, a feature that will add to the structural integrity and strength of the apparatus once vacuum is applied. Moreover, the interconnected panels or sheets must themselves be of sufficient strength to resist collapsing under vacuum conditions. The strength rating of the sheets will depend upon the vacuum strength being used.

When emplacing the panels, and in particular when emplacing the side panels, it may be necessary to hold them in place with some kind of binding material such as plastic wrapping, twine, rope, or tape. Moreover, the edge(s) of some panels also may be formed into or have attached thereto flange-like lips (23), bent at approximate 90 degree angles, in order to permit easier and more secure fitting around the cartons which will lead to a facilitated assembly of the shell formed by the dismantleable array of surrounding panels.

Figure 4:
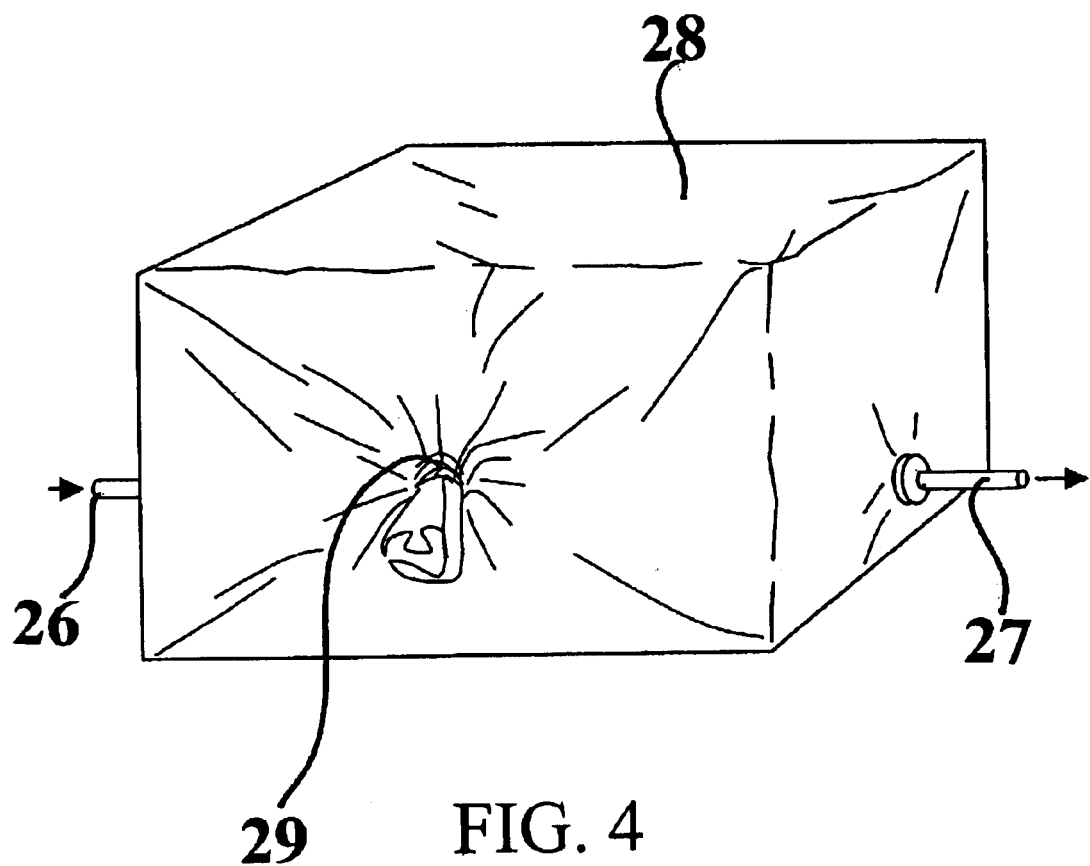
FIG. 4 shows a perspective view of the impermeable envelope that engulfs or surrounds the shell.

The next step is to enclose the shell with an impermeable but flexible envelope. See FIG. 4. This envelope should be made of material that is sufficiently strong to withstand not only vacuum conditions but also exposure to common pesticides such as HBR. The flexible envelope is sealed by various mechanisms including, but not limited to, ties and zip closures in order to provide an airtight seal around the cartons. The envelope has one or more inlet ports for fumigants or gas to enter the envelope, and one or more outlet ports for evacuation of gases and for connection to a vacuum-generating means.

Once the envelope has been sealed around the shell, vacuum means may be applied, thus creating vacuum conditions inside the envelope. When air from the sealed shell is withdrawn through the outlet port by a vacuum pump, negative pressure will be created inside the sealed shell causing the panels to press against the cartons.

Without the shell formed by the rigid or semi-rigid panels, vacuum would ordinarily crush or substantially damage the cartons containing the agricultural commodities. The rigid shell, however, protects the cartons from being crushed. This protection arises from the fact that the vacuum pressure on the panels, which are in contact with the underlying cartons, is distributed to the entire matrix of supporting walls of the stacked cartons. At a given level of vacuum, the collective strength of the carton walls prevents the collapse of the shell (and supporting cartons), thereby preserving the integrity of the cartons and their contents. In other words, the commodity cartons themselves become part of the apparatus, or more properly the supporting structure of the apparatus.

Vacuum levels will have an upper limit depending on the strength of the produce cartons used. If high vacuum levels are desired, for example, it may be necessary to use cartons that are stronger than the ordinary produce packing cartons that are in common use. And a high vacuum level, by itself and without use of insecticidal fumigants, has been shown to be an effective means of pest control. Therefore, it may be desirable to use especially-designed and manufactured cartons that are reinforced in order to withstand high levels of vacuum. It must be reiterated, however, that lower levels of vacuum can also be effective in controlling pests, with or without use of special cartons or use of insecticidal fumigants.

Fumigants may be introduced in the envelope under vacuum conditions and contained therein for a prescribed period. This period will depend on insecticidal potency of the fumigant(s), susceptibility of the particular pest to the fumigant being used, the life stage of the pest, ambient temperature, and other factors such as use of synergists.

There may also be a means to control the connections between the envelope and the gas source, and the envelope and the vacuum generator. This means ordinarily will include solenoid valves installed between inlet port(s) and the gas source, and/or between the outlet port(s) and the vacuum pump. Solenoid valves may be further controlled by a timing device and/or pressure activated switch that may be connected to the envelope to sense pressure in the envelope, thereby operating to induce, relieve, or adjust the vacuum pressure.

Alternatively, it is sometimes desirable to introduce fumigants or pesticide gas into the envelope without application of vacuum conditions. In other words, the apparatus may be used as a conventional pesticide chamber, without use of the vacuum feature.

EXAMPLES and APPLICATIONS

The specific embodiments, uses, and illustrations described herein are only meant to serve as examples and are not meant to limit the scope of the invention in any way.

Pest control and storage using the present invention may be conducted in various situations including production sites, storage sties, and during transit.

It is sometimes desirable to treat and/or store agricultural commodities under a controlled atmosphere without introduction of pesticide gases, or alternatively, after pesticide treatment. This can be achieved by first subjecting the sealed envelope to vacuum, and then releasing the vacuum in order to return the pressure of the sealed envelope to normal atmospheric conditions. Cycling vacuum and normal atmospheric conditions may be done repeatedly to renew air in the envelope and to avoid damage to the commodities. Storage of agricultural commodities under a controlled atmosphere may include elevated levels of CO2, nitrogen, and one or more noble gases such as argon or helium.

For general insect control, a controlled atmosphere with elevated CO2 concentrations may be introduced into the envelope under vacuum. Alternating or cycling controlled hypobaric atmosphere containing elevated CO2 concentrations with ambient conditions may be repeated to vent out plant volatiles and renew the air in the envelope to avoid injuries to commodities.

Effective pest control without the use of pesticides may be achieved by maintaining high levels of vacuum (<=50 mbar) for several days. This application may require use of relatively strong produce cartons.

Pesticides or fumigants may be introduced into the envelope to conduct pest control. Such use may be with or without vacuum, although hypobaric conditions tend to increase the effectiveness of treatment with fumigants. Fumigants that may be used include methyl bromide and hydrogen cyanide.

In order to retard spoilage and thereby extend shelf life, particularly after initial treatment, it is sometimes desirable to maintain the produce in hypobaric conditions in a low oxygen environment. To maintain this condition, it may be necessary to perform intermittent vacuuming in combination with introduction of low-oxygen atmosphere.

Gaseous chemicals that extend shelf life of fresh produce may also be introduced into the envelope under vacuum for postharvest storage. Such chemicals include 1-methylcyclopropene (1-MCP).

What is claimed is:

1. An apparatus for treating materials, which comprises:
   a. an array of rigid panels adapted to substantially surround an array of containers containing materials and to form a dismantleable enclosure around said array of containers;
   b. an impermeable envelope adapted to form a flexible enclosure around said dismantleable enclosure;
   c. at least one port in said impermeable envelope for passage of gas; and
   d. means attached to said port to treat the materials inside the impermeable envelope.

2. The apparatus of claim 1, wherein said array of containers is in the form of a substantially symmetrical stack having three axes and a plurality of sides, with each of said sides being covered by a single rigid panel that is of the approximate size and shape of that side.

3. The apparatus of claim 1, wherein at least one of said panels is formed from a plurality of interconnecting subpanels.

4. The apparatus of claim 1, wherein at least one of said panels comprises a vent extending through said panel.

5. The apparatus of claim 1, wherein the means to treat said materials comprises a vacuum pump.

6. The apparatus of claim 1, wherein the means to treat said materials comprises a device to introduce pesticide gas.

7. The apparatus of claim 1, wherein said materials comprise agricultural commodities.

8. A method for treating materials comprising the following steps:
   a. providing an array of containers containing material to be treated;
   b. substantially surrounding said array of containers with an array of rigid panels to form a dismantleable enclosure around said array of containers;
   c. surrounding said dismantleable enclosure with a flexible impermeable envelope; and
   d. creating a controlled atmosphere inside said impermeable envelope.

9. The method of claim 8, wherein said controlled atmosphere comprises a vacuum.

10. The method of claim 8, wherein said controlled atmosphere comprises elevated levels of a gas selected from the group consisting of carbon dioxide, nitrogen, helium, and argon as compared to the level of that gas in air.

11. The method of claim 8, wherein said controlled atmosphere comprises a pesticide.

12. The method of claim 8, and further comprising:
a. storing said containers under vacuum conditions.

13. The method of claim 8, wherein said material is an agricultural commodity.

14. An apparatus for treating materials, comprising:
a. a substantially symmetrical stack of boxes containing the materials to be treated;
b. a shell around said boxes, said shell formed by application of a rigid panel to each side of said stack, each of said panels being of approximately the same size and shape of the side to which it is applied;
c. an impermeable envelope wrapped around said shell;
d. at least one port in said impermeable envelope for passage of gas; and
e. means attached to said port to modify the atmospheric conditions inside the impermeable envelope.

15. The apparatus of claim 14, wherein the means to modify the atmospheric conditions is a device to create hypobaric conditions.

16. The apparatus of claim 14, wherein the means to modify the atmospheric conditions is a device to introduce and evacuate pesticide gas.

17. The apparatus of claim 14, wherein the panel is formed from a plurality of subpanels.

18. The apparatus of claim 14, wherein a vent is disposed within at least one of the panels.

19. The apparatus of claim 14, wherein the materials to be treated comprise agricultural commodities.

* * * * *